(12) United States Patent
Wang

(10) Patent No.: US 7,095,904 B2
(45) Date of Patent: Aug. 22, 2006

(54) METHOD AND APPARATUS FOR DETERMINING BEST FOCUS USING DARK-FIELD IMAGING

(75) Inventor: Weijian Wang, San Jose, CA (US)

(73) Assignee: Ultratech, Inc., San Jose, CA (US)

( * ) Notice: Subject to any disclaimer, the term of this patent is extended or adjusted under 35 U.S.C. 154(b) by 162 days.

(21) Appl. No.: 10/758,069

(22) Filed: Jan. 14, 2004

(65) Prior Publication Data

US 2004/0145671 A1 Jul. 29, 2004

Related U.S. Application Data

(62) Division of application No. 09/547,559, filed on Apr. 12, 2000, now abandoned.

(51) Int. Cl.
*G06K 9/36* (2006.01)

(52) U.S. Cl. ............ 382/280; 250/201.3; 250/201.7; 144/145; 144/255; 144/275

(58) Field of Classification Search ............ 250/201.3, 250/201.7; 382/144, 145, 255, 275
See application file for complete search history.

(56) References Cited

U.S. PATENT DOCUMENTS

| 4,549,084 A | 10/1985 | Markle | 250/548 |
|---|---|---|---|
| 4,952,970 A | 8/1990 | Suzuki et al. | 355/43 |
| 5,369,430 A | 11/1994 | Kitamura | 348/94 |
| 5,552,594 A * | 9/1996 | Vandenberg et al. | 250/201.7 |
| 5,650,621 A * | 7/1997 | Tsuneta et al. | 250/311 |
| 6,268,093 B1 * | 7/2001 | Kenan et al. | 430/30 |
| 6,407,373 B1 * | 6/2002 | Dotan | 250/201.3 |
| 6,940,585 B1 * | 9/2005 | Nomura et al. | 355/55 |

* cited by examiner

*Primary Examiner*—Kanjibhai Patel
*Assistant Examiner*—Gregory Desire
(74) *Attorney, Agent, or Firm*—Allston L. Jones

(57) ABSTRACT

A method and apparatus (10) for determining a best focus position of an object (30) relative to a reference position (e.g., axis A) of a dark-field optical imaging system (20), with an effective focusing range up to 10 times of the depth of field of the system. The method includes the steps of first forming a dark-field image of the object at different focus positions ($z_m$). Each dark-field image has a corresponding image intensity distribution with an average intensity and a variance of intensity. The next step is forming a set of contrast values by calculating a contrast value ($C_m$) for each dark-field image based on the variance and the average intensity. The last step is determining the best focus position by fitting a Lorentzian function to the set of contrast values plotted as a function of the different focus positions and identifying the focus position associated with the maximum contract value ($C_{max}$). The second step includes digitizing each dark-field image such that the image intensity distribution for each the dark-field image is a digitized image intensity distribution comprising discrete gray-scale intensity levels ($I_n$) corresponding to a discrete plurality of n pixels, and then arranging each the digitized image intensity distribution into a histogram ($H(I_n)$) of an amount of the pixels having a given the gray-scale intensity level ($I_n$).

15 Claims, 3 Drawing Sheets

METHOD AND APPARATUS FOR DETERMINING BEST FOCUS USING DARK-FIELD IMAGING

This application is a divisional of 09/547,559 filed Apr. 12, 2000 now abandoned.

FIELD OF THE INVENTION

The present invention relates to methods and apparatus for determining best focus of an optical imaging system, and in particular relates to a system where darkfield imaging is used to determine best focus.

BACKGROUND OF THE INVENTION

Determining the best focus position ("best focus") is an age-old problem for optical apparatus ranging from photographic cameras, to binoculars, to printing apparatus. Determining best focus is particularly troublesome and time consuming in optical apparatus used to manufacture devices. For example, many applications involve processing substrates where the substrate needs to be located within a depth of focus of the optical apparatus that is on the order of microns, and where best focus needs to be determined to up to a fraction of a micron over numerous exposure fields on a substrate.

For example, in photolithography, features on a mask are imaged onto a photosensitive substrate. Many of the mask features are at the resolution limit of the imaging lens (e.g., $0.7\lambda/NA$, where NA is the numerical aperture of the imaging lens). These features will only print over a depth of focus of approximately $\pm\lambda/NA^2$, which is typically only several microns or less. Specific features on the wafer are often used to determine best focus. Sometimes this process involves the time-consuming method of exposing fields on a single substrate at different focus settings, developing the wafer, and then evaluating the sharpness of the printed features.

In laser thermal processing (LTP), high-irradiance radiation (light) is imaged onto individual fields on a highly reflective substrate to be processed. The substrate needs to be within the imaging lens depth of focus of the LTP apparatus, which is generally on the order of tens of microns (e.g., 15 microns).

There are many known methods for determining best focus. Many of the known methods include the steps of forming a bright-field image of a feature at a particular focus position {say, at a point $z_m$ along z} and calculating a maximum intensity value Imax and a minimum intensity value Imin. The next step is calculating a contrast function F=(Imax−Imin)/(Imax+Imin). This process is repeated for different focus positions $\{z_1, z_2, z_3, \ldots\}$ surrounding what is thought to be best focus. A maximum value of F versus z is then determined by fitting a curve to the F versus z data points. The value of z that provides the maximum value of F ($F_{max}$) from this curve fit is taken as the best focus position.

Other techniques include comparing the modulation of two objects at different focus positions and determining how to shift focus so that their modulation is equal (e.g., U.S. Pat. No. 4,549,084), a method that compares the image of a second object as formed by a projection optical imaging system at a predetermined plane to a first object (e.g., U.S. Pat. No. 4,952,970), and a method that involves calculating correlation values between images of an object to a pre-stored reference pattern (e.g., U.S. Pat. No. 5,369,430).

However, the need to determine best focus has recently evolved from photolithographic applications, where a predetermined pattern on the substrate is imaged at various focus positions and analyzed, to LTP applications, where a reflective substrate which may not have a pre-determined pattern to be imaged, needs to be placed at best focus quickly and accurately. Unfortunately, highly reflective substrates are difficult to focus using known techniques, because it is difficult to form an image of an object located on a reflective substrate due to the large amount of reflected light.

In addition, best-focus techniques presently applicable to photolithography have several limitations, including being limited to imaging certain patterns having a size at or near the resolution limit of the imaging lens. Further, the methods are not suited for all imaging situations. One such situation is where focus is preferably determined without having to remove the substrate from the imaging field, or where the object (e.g., an alignment mark) is imaged to determine best focus is present on the wafer but the substrate is highly reflective, so that bright-field imaging is not effective. Also, present techniques tend to be time consuming, which limits the ability to process devices or substrates in a timely manner (i.e., limits through-put), and is not generally accurate enough for the most demanding focus situations.

SUMMARY OF THE INVENTION

The present invention is a method and apparatus for determining best focus in dark-field imaging. The present invention involves using dark-field imaging in combination with a contrast function, C, based on the variance in the number of captured image pixels having a given intensity value over a region of interest (ROI), and fitting the contrast function, C, versus focus position, z, to a Lorentzian curve to obtain the "best focus position," i.e., one that maximizes the contrast function, C, as described below. This invention provides a mechanism that enables an optical imaging system using dark-field illumination to automatically focus onto an object quickly.

Accordingly a first aspect of the invention is a method of determining a best focus position of an object relative to a reference position in an optical imaging system. The effective focusing range may be up to 10 times of the depth of field of the system. The method comprises the steps of first, forming a dark-field image of the object at different focus positions. Each dark-field image has a corresponding image intensity distribution with an average intensity and a variance of intensity. The next step is forming a set of contrast values by calculating a contrast value for each dark-field image based on the variance and the average intensity. The final step is determining the best focus position by fitting a Lorentzian function to the set of contrast values plotted as a function of the different focus positions.

A second aspect of the invention is an apparatus for automatically determining the best focus position of an object relative to a reference position. The apparatus comprises an optical imaging system having an optical axis, an image plane, and an object plane. The apparatus further includes an object stage, arranged at or near the object plane and along the optical axis, capable of supporting and moving the object in response to an object stage electrical signal. Also included in the apparatus is a light source arranged to illuminate the object such that the optical imaging system forms a dark-field image of the object at the image plane. The apparatus further includes a detector, arranged at the image plane, capable of generating a detector electrical signal in response to the dark-field image formed thereon.

The apparatus also includes an object stage control unit operatively connected to the object stage, to effectuate relative motion between the object stage and the optical imaging system. In addition, the apparatus includes a computer in electrical communication with the detector and the object stage control unit, the computer being capable of processing the detector electrical signal and calculating a dark-field contrast value therefrom, and generating the object stage electrical signal to drive the object stage so as to optimize the dark-field contrast value.

A third aspect of the invention is an algorithm embodied in computer software. That is to say, the present invention also includes a computer-readable medium capable of holding data corresponding to four or more dark-field image intensity distributions measured at different focus positions, and holding instructions for determining a best focus position based on the data, by performing the steps of: first, calculating an average intensity and a variance for each of the dark-field image intensity distributions; second, forming a set of contrast values by calculating a contrast value for each image intensity distribution based on the variance and the average intensity; and determining the best focus position by fitting a Lorentzian function to the set of contrast values plotted as a function of the different focus positions.

DETAILED DESCRIPTION OF THE INVENTION

The present invention is a method and apparatus for determining best focus in dark-field imaging. The present invention involves using dark-field imaging in combination with a contrast function, C, based on the variance in the number of captured image pixels having a given intensity value over a region of interest, and fitting the contrast function, C, versus focus position, z, to a Lorentzian curve to obtain the best focus position that maximizes the contrast function, as described below. This invention provides a mechanism that enables an optical imaging system using dark-field illumination to automatically focus onto an object quickly and accurately. In the present invention, the effective focusing range is preferably up to times the depth of field of the optical imaging system.

Figure 1:
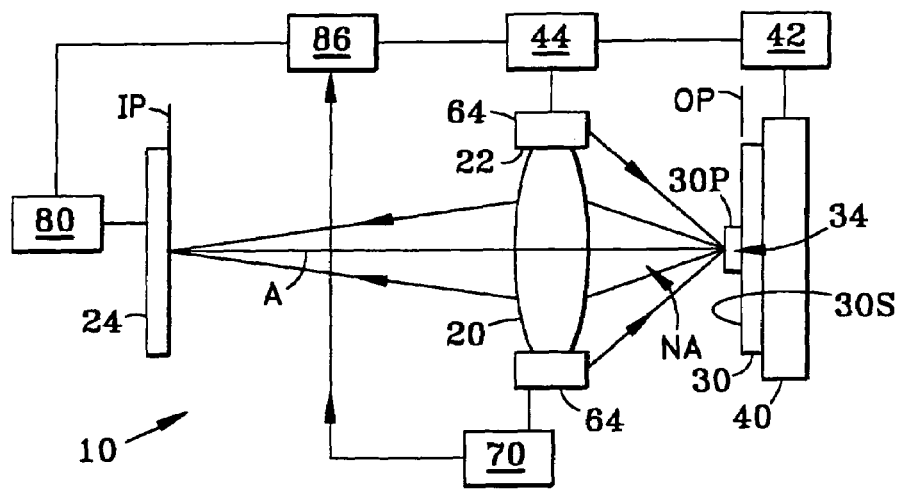
FIG. 1 is a schematic cross-sectional diagram of the dark-field imaging apparatus according to the present invention.
Figure 2:
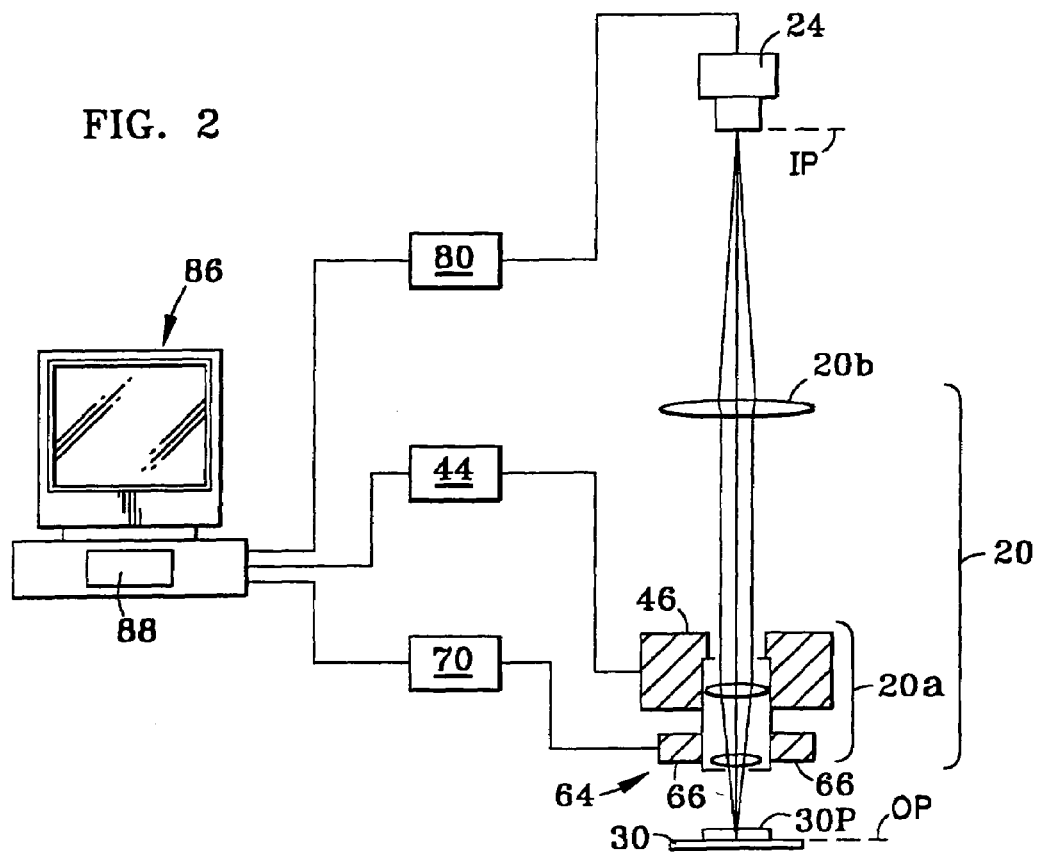
FIG. 2 is a schematic cross-sectional diagram of the dark-field imaging apparatus similar to the apparatus shown in FIG. 1, but showing more detail of the optical imaging system and the computer, and providing an alternate view of how certain of the components of the apparatus are interconnected.

With reference to FIGS. 1 and 2, dark-field imaging apparatus 10 for performing the method of the present invention comprises an optical imaging system 20 having an outer edge 22, an objectwise numerical aperture, NA, an image plane IP, an object plane OP and an optical axis A. Optical imaging system 20 may comprise, for example, an objective lens 20a and a tube lens 20b, as shown in FIG. 2. objective lens 20a may be, for example, an infinity-corrected microscope objective having 10× power operating at visible wavelengths. An exemplary microscope objective is made by Mitutoyo Corporation, 965 Corporate Boulevard, Aurora, Ill. 60504. Tube lens 20b may be a conventional long-focal-distance lens with focal length of 200 mm.

Apparatus 10 further includes a digital detector 24, such as a CCD array, arranged at image plane IP. An exemplary detector 24 is a CCD array made by Cohu, Inc., Electronics Division, 5755 Kearny Villa Road, San Diego, Calif. 92123, which includes a Sony CCD chip having a 640×480 array of 10-micron pixels, which provides 1 micron/pixel image resolution when using a 10× optical imaging system 20. An object 30 to be viewed is arranged at object plane OP. Object 30 has a reflective surface 30S with a pattern 30P formed thereon, and is viewed over a region of interest (ROI) 34. Pattern 30P may be a predetermined structure such as an alignment mark, or may simply be surface roughness sufficient to scatter light into the NA of optical imaging system 20. Object 30 may be, for example, a workpiece such as a silicon wafer.

Apparatus 10 further includes an object stage 40 which supports object 30 at substantially right angles to optical axis A. Object stage 40 is preferably movable along optical axis A as well as perpendicular thereto via an object stage control unit 42, operatively connected to the object stage to effectuate relative motion between optical imaging system 20 and object 30. Alternatively, an optical imaging system control unit 44 operatively connected to optical imaging system 20 may provide for axially movement of the optical imaging system along optical axis A as well as perpendicular thereto to effectuate movement of the optical imaging system relative to object 30. Optical imaging system control unit 44 may include a piezo-electric actuator 46 (see FIG. 2) that provides for incremental movement of optical imaging system 20. Though both optical imaging system control unit 44 and object stage control unit 42 are shown for the sake of discussion; only one of these is necessary in practice.

Apparatus 10 also includes an annular light source 64 located adjacent outer edge 22 of optical imaging system 20 as shown, and is positioned so as to illuminate object 30 from an angle that is outside the NA of the objective lens. Illumination light source 64 is in electrical communication with a light source control unit 70 that controls the operation of the light source. An exemplary light source 64 is a fiber ring illuminator 66, as illustrated in FIG. 2.

Apparatus 10 further includes a frame-grabber 80 in electrical communication with detector 24, and a computer 86 in electrical communication with the frame grabber (the latter may be part of computer 86 but is described here as being separate for ease of discussion). Computer 86 is also in electrical communication with object stage controller 42, optical imaging system control unit 44, and light source controller 70. Computer 86 also includes a computer processor, or may itself be considered a computer processor. Computer 86 also includes a storage medium 88, such as a hard drive (see FIG. 2), which stores data/information, and serves as a computer-readable medium. The above-described configuration is one example of a dark-filed imaging system and other such systems are known to those skilled in the art.

Figure 3:
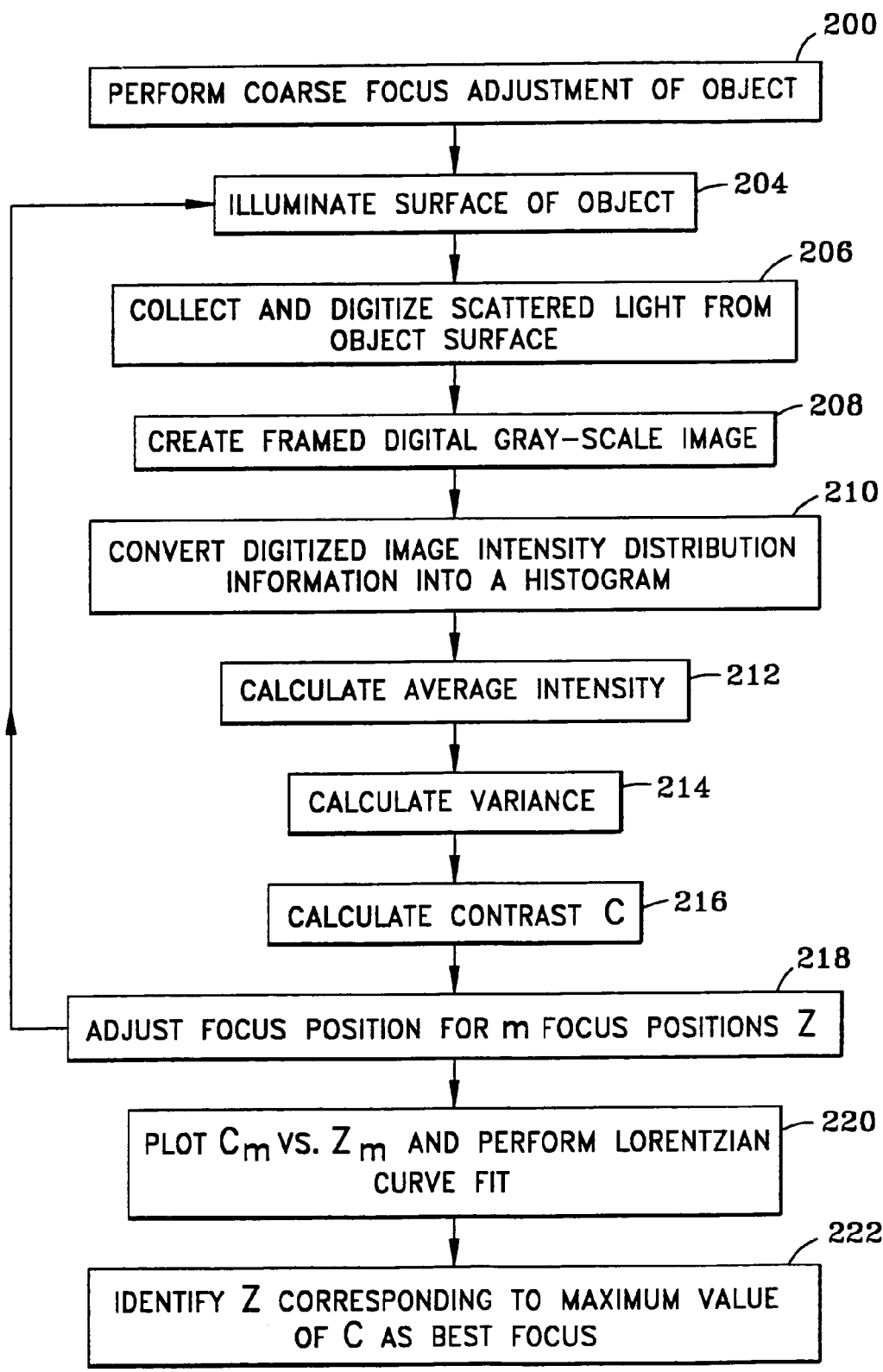
FIG. 3 is a flow diagram of the method steps for practicing the present invention.

With continuing reference now to FIGS. 1 and 2, and also to the flow diagram of FIG. 3, the operation of apparatus 10 is now described. In the first step 200, computer 86 provides a first output signal to object stage control unit 42 or optical imaging system control unit 44 (or both) so as to provide relative movement of object 30 supported on object stage 40 and optical imaging system 20 to bring object 30 into coarse focus adjustment. Here, coarse focus adjustment means within a reasonable distance (i.e., effective auto-focus range) of the best focus. Also, the object is roughly aligned with respect to optical imaging system 20. For example, alignment may be made with respect to an x-y-z coordinate axis that includes optical axis A as the z-axis.

Once optical imaging system 20 and object 30 are so adjusted, in the second step 204, computer 86 provides a second output signal to light source control unit 70 to activate light source 64. The latter then illuminates surface 30S of object 30.

In the third step 206, light scattered from pattern 30P on object 30 is captured by the NA of optical imaging system 20 and is imaged onto detector 24, where the image is captured.

In the fourth step 208, detector 24 sends a third electrical output signal corresponding to the captured image to frame grabber 80, which converts the image to a framed digital gray-scale image (i.e., digitized image intensity distribution) of pattern 30P. Frame grabber 80 then sends a fourth electrical signal containing information about the framed digital gray-scale image intensity distribution to computer 86.

Figure 4:
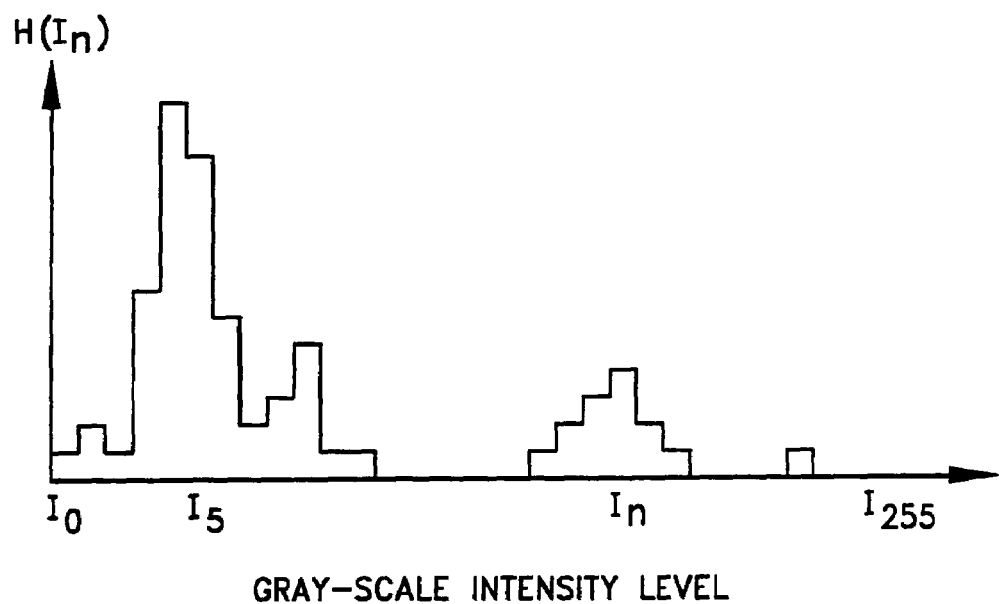
FIG. 4 is an exemplary histogram of an image of a region of interest on the object, indicating the number $H(I_n)$ of pixels having a particular gray-scale intensity level $I_n$.

In the fifth step 210, computer 86 then converts the digitized image intensity distribution information into a histogram $H(I_n)$ of the number of pixels in ROI 34 of the digital image having a given gray-scale intensity level $I_n$, where the $I_n$'s are the discrete gray intensity levels supported by frame grabber 80. FIG. 4 is a schematic histogram $H(I_n)$ for an 8-bit digitizer having 256 gray-scale intensity levels, where $I_0, I_1, I_2, I_3, \ldots, I_{255}$ etc. represent intensity levels 0, 1, 2, 3, ..., 255. This information is saved in storage medium 88.

In the sixth step 212, from histogram $H(I_n)$ of step 210, and average intensity (I) is calculated by equation (1):

$$\langle I \rangle = \frac{\sum_{I_n} H(I_n) I_n}{\sum_{I_n} H(I_n)}, \quad (1)$$

The sums are performed over all the discrete intensity levels.

In the seventh step 214, the variance is calculated by equation (2):

$$\sigma_I^2 = \frac{\sum_{I_n} H(I_n)(I_n - \langle I \rangle)^2}{\sum_{I_n} H(I_n)}. \quad (2)$$

Again, the sums are performed over all the discrete intensity levels.

In the eighth step 216, the contrast, C, is calculated by equation (3), using the result of equations (1) and (2):

$$C = \frac{\sigma_I}{\langle I \rangle}. \quad (3)$$

The ninth step 218 in the process is adjusting focus and repeating steps 204-216 for m focus positions z $\{z_1, z_2, z_3, z_4, \ldots z_m\}$, where m≧4 (i.e., at least four focus positions) to obtain contrast values C $\{C_1, C_2, C_3, C_4, \ldots C_m\}$, and preferably five or more focus positions over an effective range of focus (ERF) up to the order of 10 times of the depth of field of optical imaging system 20. The actual number of different focus settings required depends on variations in the position of object plane OP, and the accuracy desired. For example, for a depth of field, $\Delta Z$, on the order of 30 microns, an ERF of 350 microns can be used. In theory, only four focus positions may be used, but the accuracy of the result may suffer from measurement variations.

Next, in the tenth step 220, the discrete values of the contrast C $\{C_1, C_2, C_3, C_4, \ldots C_m\}$ are plotted as a function of focus positions z $\{z_1, z_2, z_3, z_4, \ldots z_m\}$ and the resulting curve is fit to a Lorentzian function, as set forth in equation (4) by known means, such as least square fitting:

$$C = a_1 + \frac{a_2}{(z - a_3)^2 + a_4}, \quad (4)$$

wherein, $a_1, a_2, a_3$, and $a_4$ are the fitting parameters.

Figure 5:
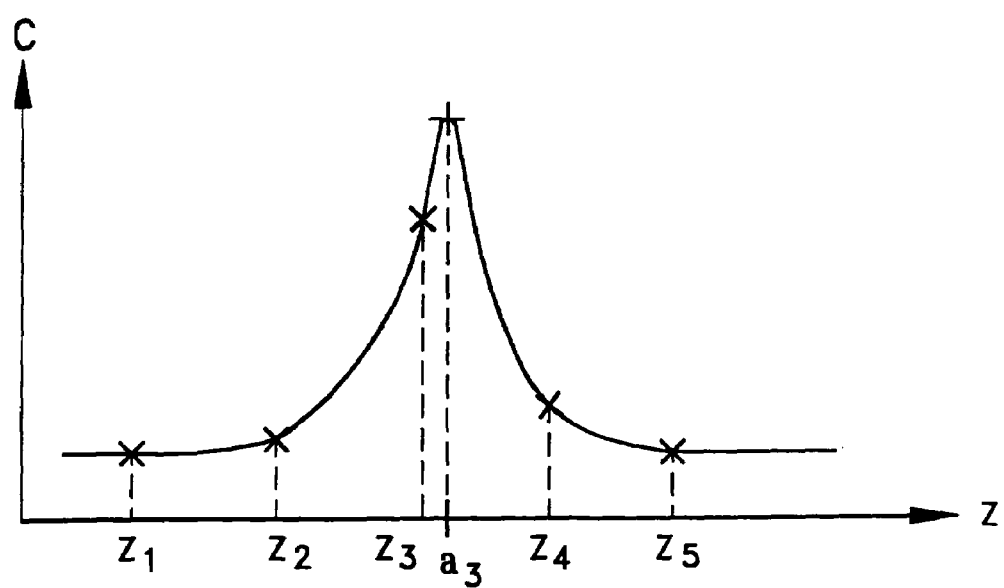
FIG. 5 is an exemplary plot of the contrast, C, versus focus position, z, for a five focus values, $z_m$, with a Lorentzian fit to the focus values, and wherein a focus position, $a_3$, corresponds to the value of $C_{max}$.

In the eleventh step 222, the value of z corresponding to the maximum value $C_{max} = (a_1 + a_2/a_4)$ of C is taken as the z-location corresponding to best focus. For example, as shown in FIG. 5, the value of z corresponding to $C_{max}$ is $a_3$, which is taken as the z-location corresponding to best focus.

The present invention as described above can be directly applied to the semiconductor art, but is not so limited. For example, apparatus 10, when combined with the above-described method, can be used for any application where an object needs to be positioned relative to an optical imaging system. The apparatus and method are particularly effective where the object is highly reflective. An exemplary application outside the field of semiconductor technology is machine vision for laser processing (e.g., cleaning or machining) of metal parts.

The present invention has several advantages. One is finding best focus more accurately than known methods because the Lorentzian shape of the through-focus dark-field contrast function is more sharply peaked than the conventional parabolic function presently assumed for bright-field imaging within a very tight vicinity of the best focus. Another advantage is that the method is not object-dependent, since it relies on dark-field imaging of light scattered from edges of objects or from surface roughness (e.g., the graininess of the surface of the object). Other advantages are that the invention is relatively simple to implement, is low-cost, and lends itself to automated measurement and control, which is useful in fields that require maintaining history trails of processes.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of determining a best focus position of an object relative to a reference position in an optical imaging system, comprising the steps of:
   a) forming a dark-field image of the object at different focus positions, each said dark-field image having a corresponding image intensity distribution with an average intensity and a variance of intensity;
   b) forming a set of contrast values by calculating a contrast value for each said dark-field image based on said variance and said average intensity; and
   c) determining the best focus position by fitting a Lorentzian function to said set of contrast values plotted as a function of said different focus positions;
   wherein said step b) further includes the steps of:
   d) digitizing each said dark-field image such that said image intensity distribution for each said dark-field image is a digitized image intensity distribution comprising discrete gray-scale intensity levels $I_n$ corresponding to a discrete plurality of n pixels; and
   e) arranging each said digitized image intensity distribution into a histogram, $H(I_n)$, of an amount of said pixels having a given said gray-scale intensity level, $I_n$.

2. A method according to claim 1, further including the steps of:
   f) calculating said average intensity for each said discrete image intensity distribution via the equation $$\langle I \rangle = \frac{\sum_{I_n} H(I_n) I_n}{\sum_{I_n} H(I_n)};$$

g) calculating said variance for each said discrete image intensity distribution via the equation $$\sigma_I^2 = \frac{\sum_{I_n} H(I_n)(I_n - \langle I \rangle)^2}{\sum_{I_n} H(I_n)}; \text{ and}$$

h) calculating said contrast value, C, for each said discrete image intensity distribution via the equation $$C = \frac{\sigma_I}{\langle I \rangle}.$$

3. A method according to claim 2, wherein in said step c) of determining the best focus position includes performing a curve fit to the equation $$C = a_1 + \frac{a_2}{(z - a_3)^2 + a_4},$$

wherein $a_1$, $a_2$, $a_3$ and $a_4$ are Lorentzian curve-fitting parameters, z indicates a distance along a focus direction, and said parameter $a_3$ corresponds to the best focus position along said focus direction.

4. A method according to claim 1, wherein the object comprises a region of interest on a substantially reflective substrate.

5. A method according to claim 4, wherein said region of interest includes a pattern formed on said substrate.

6. A method according to claim 5, wherein said pattern is a predetermined structure capable of scattering light.

7. A method according to claim 5, wherein said pattern is surface roughness.

8. A method according to claim 1, wherein said reference position is a coordinate system of an apparatus that forms said plurality of dark-field images.

9. A method according to claim 1, wherein the optical imaging system has a depth of field, and an effective focusing range of up to 10 times said depth of field.

10. In a computer system, a method of determining the best focus position of an object relative to a reference position, based on a plurality of dark-field images of the object, comprising the steps of:
    a) storing, in a computer readable medium, data corresponding to the plurality of dark-field images, each said dark-field image being associated with a different focus position and having an associated image intensity distribution with an average and a variance;
    b) forming, in said computer system, a set of contrast values by calculating a contrast for each said dark-field image, based on said variance and said average; and
    c) determining, in said computer system, the best focus position by fitting a Lorentzian function to said set of contrast values slotted as a function of said different focus positions;
    wherein said step b) further includes the steps of:
    d) digitizing each said dark-field image with said image intensity distribution for each said dark-field image having a digitized image intensity distribution comprising discrete gray-scale intensity levels, $I_n$ corresponding to a discrete plurality of n pixels; and
    e) arranging each said digitized image intensity distribution into a histogram, $H(I_n)$, of an amount of said pixels having a given said gray-scale intensity level, $I_n$.

11. A method in a computer system according to claim 10, further including the steps of:
    f) calculating said average intensity for each said discrete image intensity distribution via the equation $$\langle I \rangle = \frac{\sum_{I_n} H(I_n) I_n}{\sum_{I_n} H(I_n)};$$

g) calculating said variance for each said discrete image intensity distribution via the equation $$\sigma_I^2 = \frac{\sum_{I_n} H(I_n)(I_n - \langle I \rangle)^2}{\sum_{I_n} H(I_n)}; \text{ and}$$

h) calculating said contrast value, C, for each said discrete image intensity distribution via the equation $$C = \frac{\sigma_I}{\langle I \rangle}.$$

12. A method in a computer system according to claim 11, wherein said step c) of determining the best focus position includes performing a curve fit to the equation $$C = a_1 + \frac{a_2}{(z-a_3)^2 + a_4},$$

wherein $a_1$, $a_2$, $a_3$ and $a_4$ are Lorentzian curve-fitting parameters, z indicates a distance along a focus direction, and said parameter $a_3$ corresponds to the best focus position along said focus direction.

13. A computer readable medium capable of holding data corresponding to at least four dark-field image intensity distributions measured at different focus positions, and holding instructions for determining a best focus position based on said data, by performing the steps of:
   a) calculating an average intensity and a variance for each of said dark-field image intensity distributions;
   b) forming a set of contrast values by calculating a contrast value for each image intensity distribution based on said variance and said average intensity; and
   c) determining the best focus position by fitting a Lorentzian function to said set of contrast values clotted as a function of said different focus positions
wherein said step b) further includes the steps of:
   d) digitizing each said dark-field image such that said image intensity distribution for each said dark-field image is a digitized image intensity distribution comprising discrete gray-scale intensity levels, $I_n$, corresponding to a discrete plurality of n pixels; and
   e) arranging each said digitized image intensity distribution into a histogram, $H(I_n)$, of an amount of said pixels having a given said gray-scale intensity level, $I_n$.

14. A computer readable medium according to claim 13, further including the steps of:
   f) calculating said average intensity for each said discrete image intensity distribution via the equation $$\langle I \rangle = \frac{\sum_{I_n} H(I_n) I_n}{\sum_{I_n} H(I_n)};$$

g) calculating said variance for each said discrete image intensity distribution via the equation $$\sigma_I^2 = \frac{\sum_{I_n} H(I_n)(I_n - \langle I \rangle)^2}{\sum_{I_n} H(I_n)}; \text{ and}$$

h) calculating said contrast value, C, for each said discrete image intensity distribution via the equation $$C = \frac{\sigma_I}{\langle I \rangle}.$$

15. A computer readable medium according to claim 14, wherein said step c) of determining the best focus position includes performing a curve fit to the equation $$C = a_1 + \frac{a_2}{(z-a_3)^2 + a_4},$$

wherein $a_1$, $a_2$, $a_3$ and $a_4$ are Lorentzian curve-fitting parameters, z indicates a distance along a focus direction, and said parameter $a_3$ corresponds to the best focus position along said focus direction.

* * * * *